United States Patent
Lee et al.

(10) Patent No.: US 10,122,291 B2
(45) Date of Patent: Nov. 6, 2018

(54) REDUNDANT CONTROL DEVICE AND METHOD OF HVDC SYSTEM

(71) Applicant: LSIS CO., LTD., Anyang-si, Gyeonggi-do (KR)

(72) Inventors: Seung Hun Lee, Namyangju-si (KR); Jong Bae Kim, Seoul (KR); Eung Soo Kim, Anyang-si (KR)

(73) Assignee: LSIS CO., LTD., Anyang-si, Gyeonggi-Do (KR)

( * ) Notice: Subject to any disclaimer, the term of this patent is extended or adjusted under 35 U.S.C. 154(b) by 310 days.

(21) Appl. No.: 15/057,353

(22) Filed: Mar. 1, 2016

(65) Prior Publication Data

US 2016/0268914 A1  Sep. 15, 2016

(30) Foreign Application Priority Data

Mar. 10, 2015  (KR) .................. 10-2015-0033379

(51) Int. Cl.
*H02M 5/42* (2006.01)
*G05B 9/03* (2006.01)
(Continued)

(52) U.S. Cl.
CPC ................ *H02M 5/42* (2013.01); *G05B 9/03* (2013.01); *H02H 1/0061* (2013.01); *H02H 3/08* (2013.01);
(Continued)

(58) Field of Classification Search
USPC ..................................................... 361/61–69
See application file for complete search history.

(56) References Cited

U.S. PATENT DOCUMENTS

| 4,672,529 A | 6/1987 | Kupersmit |
| 7,460,347 B2 * | 12/2008 | Schweitzer, III .... H02H 1/0061 |
| | | 361/62 |

(Continued)

FOREIGN PATENT DOCUMENTS

| CN | 102075068 A | 5/2011 |
| EP | 2822145 | 1/2015 |

(Continued)

OTHER PUBLICATIONS

European Patent Office Application No. 16155827.5, Search Report dated Jul. 11, 2016, 6 pages.

(Continued)

*Primary Examiner* — Danny Nguyen
(74) *Attorney, Agent, or Firm* — K&L Gates LLP

(57) ABSTRACT

A redundant control device of a high voltage direct current (HVDC) transmission system is provided. The redundant control device includes a first system and a second system that performs a function corresponding to that of the first system; and a first change over logic (COL) and a second COL that determine whether to switch between the first system and the system, wherein there are optical communication modules between the first system and the first COL, between the first COL and the second COL, and between the second system and the second COL to transmit and receive data, and the first COL and the second COL includes a monitoring control unit that checks a connection or wiring state of the optical communication modules and validity of transmission data.

3 Claims, 3 Drawing Sheets

(51) Int. Cl.
  *H02H 7/30* (2006.01)
  *H02H 7/26* (2006.01)
  *H02H 3/08* (2006.01)
  *H02H 1/00* (2006.01)

(52) U.S. Cl.
  CPC ............. *H02H 7/261* (2013.01); *H02H 7/263* (2013.01); *H02H 7/30* (2013.01)

(56) References Cited

U.S. PATENT DOCUMENTS

| | | | |
|---|---|---|---|
| 7,756,650 | B2 | 7/2010 | Ackermann et al. |
| 2005/0036254 | A1* | 2/2005 | Premerlani ............ H02H 7/261 361/69 |
| 2014/0025985 | A1* | 1/2014 | Tochio ................ G06F 11/2002 714/4.2 |

FOREIGN PATENT DOCUMENTS

| | | |
|---|---|---|
| JP | H04150776 | 5/1992 |
| JP | H04372522 | 12/1992 |
| JP | H05347588 | 12/1993 |
| JP | H06311655 | 11/1994 |
| KR | 2003-0073788 | 9/2003 |
| KR | 10-2005-0058622 | 6/2005 |
| KR | 10-2009-0032395 | 4/2009 |
| KR | 10-2013-0020504 | 2/2013 |
| KR | 10-2013-0101756 | 9/2013 |
| KR | 10-2013-0115776 | 10/2013 |
| KR | 10-2014-0086652 | 7/2014 |

OTHER PUBLICATIONS

Japan Patent Office Application No. 2016-040304, Office Action dated Mar. 28, 2017, 2 pages.
Moon, et al., "The Study on the Redundancy of HVDC Control and Protection System," LS Industrial Systems, Apr. 2016, 3 pages.
Korean Intellectual Property Office Application Serial No. 10-2015-0033379, Office Action dated May 12, 2016, 5 pages.
Korean Intellectual Property Office Application Serial No. 10-2015-0033379, Office Action dated Nov. 8, 2016, 4 pages.
Chinese Office Action for related Chinese Application No. 201610133087.9; action dated Jan. 3, 2018; (5 pages).
Ruike Zhu, et al.; "An Additional Frequency Control Strategy for Interconnected Systems Through VSC-HVDC"; Automation of Electric Power Systems; Aug. 25, 2014; 7 pages; vol. 38, No. 16, DOI:10.7500/AEPS 20131023007; School of Electrical Engineering and Information, et al.; China.

* cited by examiner

REDUNDANT CONTROL DEVICE AND METHOD OF HVDC SYSTEM

CROSS-REFERENCE TO RELATED APPLICATIONS

Pursuant to 35 U.S.C. § 119(a), this application claims the benefit of earlier filing date and right of priority to Korean Patent Application No. 10-2015-0033379 filed on Mar. 10, 2015, the contents of which are all hereby incorporated by reference herein in its entirety.

BACKGROUND

The present disclosure relates to a redundant control device and method, and more particularly, to a redundant control device and method of a high voltage direct current (HVDC) transmission system.

There are two power system interconnection methods, a typical one for interconnecting AC power systems as they are, and the other for interconnecting systems after converting AC power into DC power through a power converter. In recent, an interest in the method of interconnecting power systems after converting the AC power into the DC power is more increasing than the method of interconnecting AC power systems as they are. A high voltage direct current (HVDC) transmission system using a power converter is also installed between Jeju-island and Haenam-gun in Korea to interconnect power systems between Jeju-island and Haenam-gun.

An HVDC transmission method indicates a power supply method in which AC power generated at the power station is converted into DC power, and the DC power is transmitted and then re-converted into AC power in a power receiving region.

The DC transmission method has many advantages.

Firstly, since the size of a DC voltage is just about 70% of the maximum value of an AC voltage, the HVDC transmission system may easily perform device insulation and since its voltage is low, it is possible to reduce the number of insulators installed in each device and the height of an iron tower.

Since the DC method has less transmission loss than an AC method when the same power is transmitted, the best advantage of the HVDC transmission system is that power transmission efficiency may increase. The HDVC transmission system may transmit currents twice or more in the DC method than the AC method.

Since the HVDC transmission system may reduce wire consumption and the area of a transmission line, it is effective and also possible to enhance the stability of systems by connecting two systems having different voltages or frequencies.

The HVDC transmission system has no constraint on a power transmission distance and the DC transmission method needs inexpensive construction costs in land power transmission exceeding 450 Km or in submarine power transmission exceeding 40 Km as well.

Thus, the HVDC transmission system is used for a power system interconnection method of new renewable energy, especially for power transmission of a large offshore wind farm.

Since the distance between a power station and an electricity user in China and India is 1000 Km or longer, the prevalence of the HVDC transmission system is rapidly increasing recently.

Since a stable operation is very important to such an HVDC system, related facilities, such as a control of the HVDC have a redundant configuration.

Two systems that have a redundant configuration are typically connected through a SCSI cable, in which case a problem with disconnection or wiring occurs.

Also, there is a limitation in that a voltage for checking the operation of a counterpart system is affected by noise and thus a redundant control device malfunctions.

SUMMARY

Embodiments provide a redundant control device of a high voltage direct current (HVDC) transmission system that has a new structure.

Embodiments provide a redundant control device of an HVDC transmission system that that may transmit data reliably.

In one embodiment, a redundant control device of a high voltage direct current (HVDC) transmission system includes a first system and a second system that performs a function corresponding to that of the first system; and a first change over logic (COL) and a second COL that determine whether to switch between the first system and the system, wherein there are optical communication modules between the first system and the first COL, between the first COL and the second COL, and between the second system and the second COL to transmit and receive data, and the first COL and the second COL includes a monitoring control unit that checks a connection or wiring state of the optical communication modules and validity of transmission data.

An Embodiment has an advantage in that it is possible to provide a redundant control device of a high voltage direct current (HVDC) transmission system that has a new structure.

An embodiment has an advantage in that it is possible to provide a redundant control device of an HVDC transmission system that that may transmit data reliably.

The details of one or more embodiments are set forth in the accompanying drawings and the description below. Other features will be apparent from the description and drawings, and from the claims.

DETAILED DESCRIPTION OF THE EMBODIMENTS

Reference will now be made in detail to the embodiments of the present disclosure, examples of which are illustrated in the accompanying drawings.

An electric device for an electric vehicle according to an embodiment will be described in detail with reference to the accompanying drawings. The invention may, however, be embodied in many different forms and should not be construed as being limited to the embodiments set forth herein; rather, that alternate embodiments included in other retrogressive inventions or falling within the spirit and scope of the present disclosure can easily be derived through adding, altering, and changing, and will fully convey the concept of the invention to those skilled in the art.

When it is mentioned that any component is "connected" or "accessed" to another component, it should be understood that the former can be directly connected to the latter, or there may be another component in between. On the contrary, when any component is referred to as being 'directly connected' or 'directly accessed' to another component, it should be understood that there may be no other component in between.

The terms used in the present application are used only to describe specific embodiments and are not intended to limit the present disclosure. The terms in singular form include the plural form unless otherwise specified. It should be understood that the term "includes" or "has" indicates the presence of characteristics, numbers, steps, operations, components, parts or combinations thereof represented in the present disclosure but do not exclude the presence or addition of one or more other characteristics, numbers, steps, operations, components, parts or combinations thereof. Also, the term " . . . unit" in the present disclosure means a unit for processing at least one function or operation, and it may be implanted in hardware, software or a combination thereof.

In the following, the redundant control device and method of a high voltage direct current (HVDC) transmission system according to the present disclosure are described in detail with reference to FIGS. 1 to 3.

Figure 1:
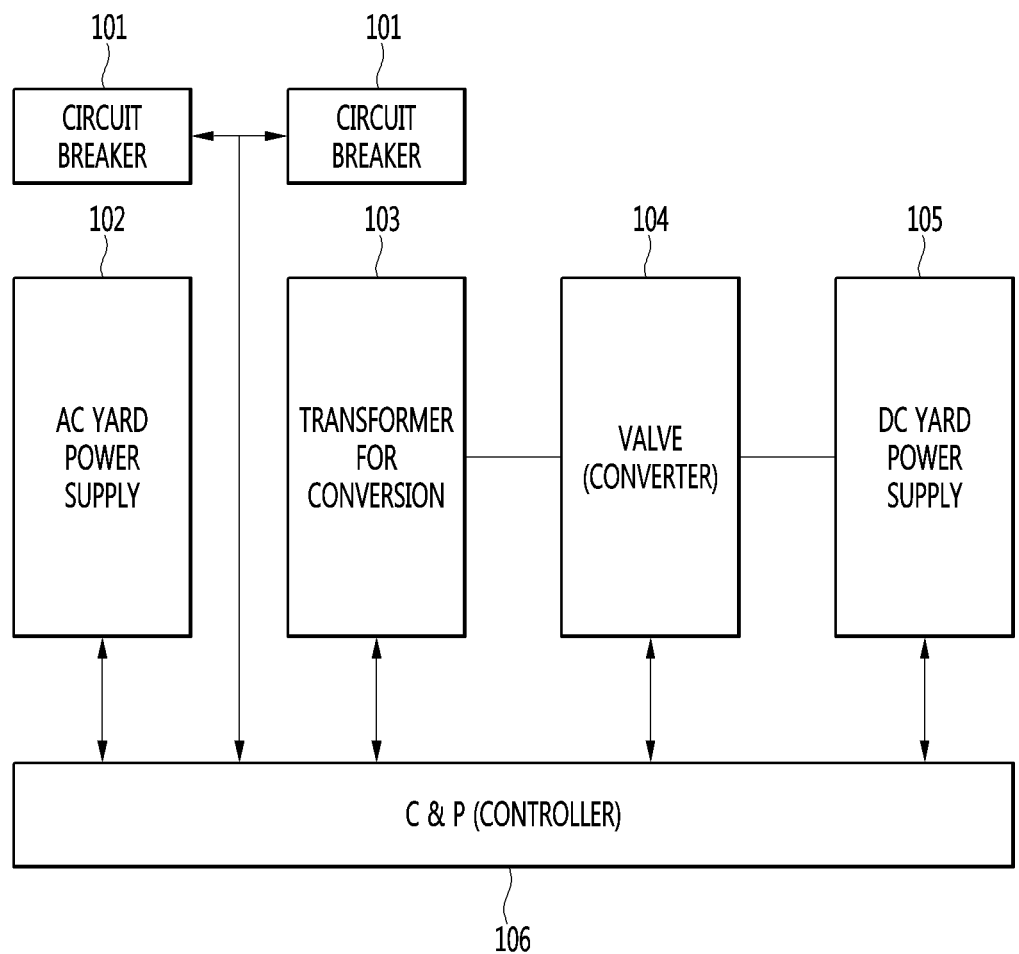
FIG. 1 is a schematic block diagram of a high voltage direct current (HVDC) transmission system.

FIG. 1 is a schematic block diagram of an HVDC system.

Referring to FIG. 1, the HVDC system may include an alternating current (AC) side power supply 102, a transformer for conversion 103, a valve (converter) 104, a DC side power supply 105, a circuit breaker 101, and a controller (control and protection; C&P) 106.

The controller 106 is a system for monitoring and protecting a controller for each function that is used in the HVDC system, and immediately deals with malfunction to protect the system when a specific controller malfunctions. The controller 106 may control the above-described components as a whole.

The same two systems may be provided so that systems performing the same function in the HVDC system continuously perform an operation. That is, there are a first system and a second system, in which case when the currently operating system has a trouble, such as system malfunction while providing a service, a standby spare system or another system that is providing a service may continue to provide the service.

In this case, each of the two systems in the HVDC system has an active mode and a standby mode, respectively, and the two systems are logically combined to operate, monitoring each other. The currently operating system is called the active system and a system being in a standby state is called the standby system. The active system is actually operating and in an active state in a system, performs the input and output operations of all connected devices and the logic of all connected devices, and provides all operation information to the standby system that is in a standby state. The standby system waits in a ready state to become the active system, i.e., in an inactive state, and is ready to immediately change to the active state through synchronization of all data and state information in the active system.

Also, each of the two systems in the HVDC system may have the active mode and monitor the state of a counterpart system while operating, and when one system has a trouble, another system may continue to provide a service.

Figure 2:
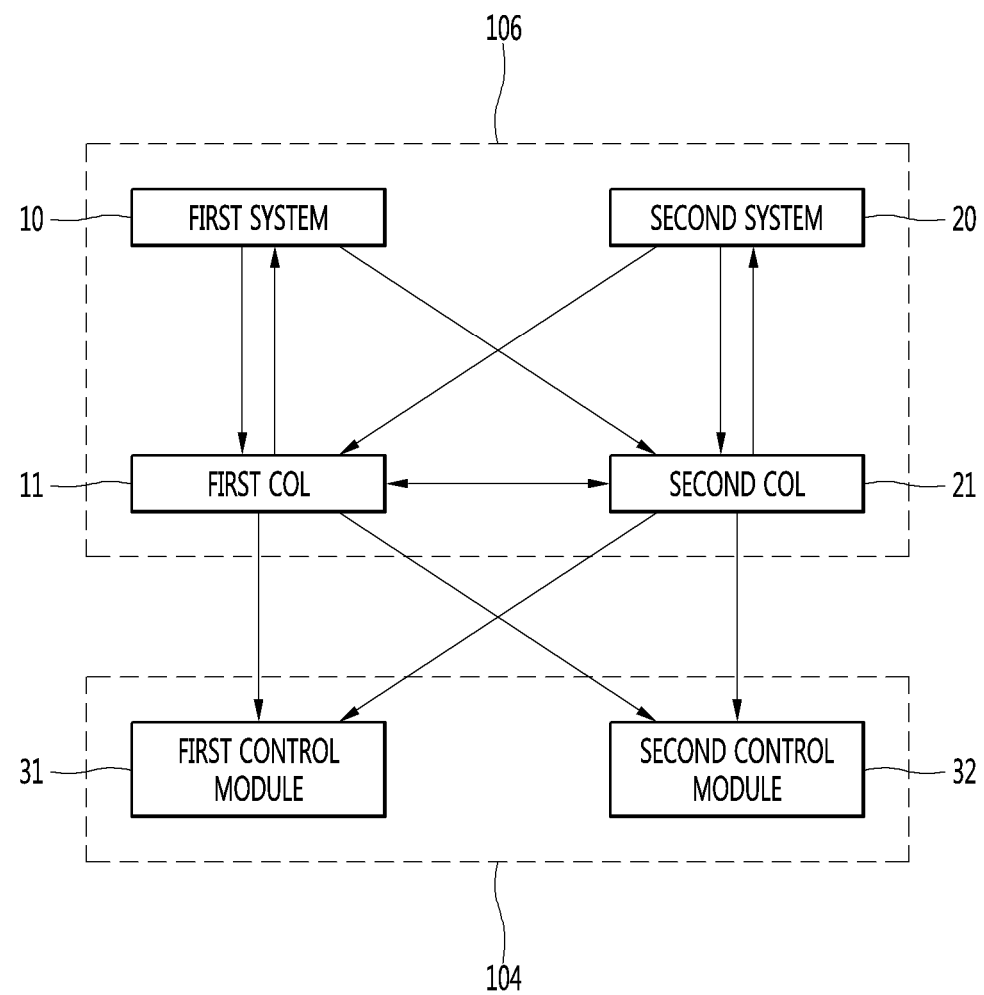
FIGS. 2 and 3 are diagrams for explaining the redundant control device and method of an HVDC transmission system according to an embodiment.
Figure 3:
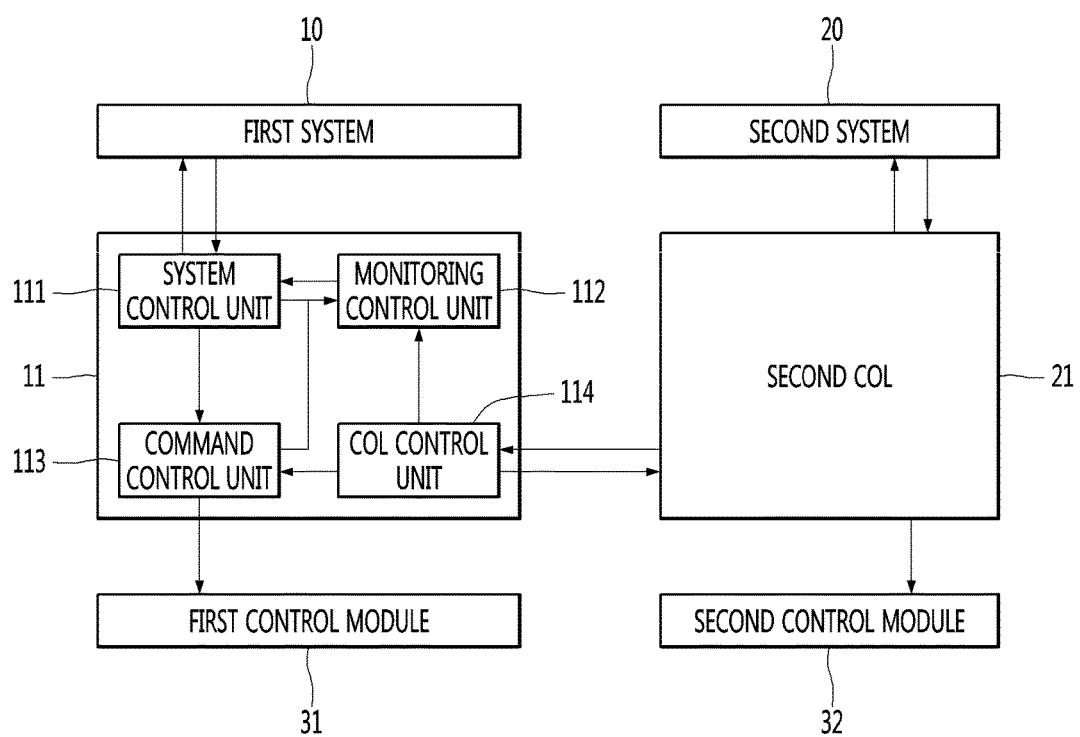

FIGS. 2 and 3 are diagrams for explaining the redundant control device and method of an HVDC transmission system according to an embodiment.

Referring to FIGS. 2 and 3, the redundant control device according to an embodiment includes a first system 10, a second system 20, a first change over logic (COL) 20 and a second COL 21. In this example, the COL is a device that determines whether to switch control in a control system that has a redundant configuration.

The first COL 11 controls a first control module 31, and the second COL 21 controls a second control module 32.

A first system 10, a second system 20, the first COL 11, and the second COL 21 may be the redundant control device that is a component of the controller 106 in FIG. 1, and the first control module 31 and the second control module 32 may be valve controllers that are components of the valve 104.

The first COL 11 transmits a control command to the first control module 31, and the second COL 21 transmits a control command to the second control module 32.

Also, the first COL 11 transmits its operation state and the operation state of the first system 10 to the second COL 21, and on the contrary, the second COL 21 transmits its operation state and the operation state of the second system 20 to the first COL 11.

Also, the first COL 11 transmits its operation state and the operation states of the second system 20 and the second COL 21 to the first system 10.

Also, the second COL 21 transmits its operation state and the operation states of the first system 10 and the first COL 11 to the second system 20.

In the HVDC transmission system as described above, when the first system 10 has a trouble, the first COL 11 senses the trouble, inhibits the first control module 31 from becoming controlled by the first COL 11, and also passes a control right to the second COL 21 and the second system 20 to enable the first control module 31 to be controlled by the second system 20.

In the HVDC transmission system, when the second system 20 has a trouble, the second COL 21 senses the trouble, inhibits the second control module 32 from becoming controlled by the second COL 21, and also passes a control right to the first COL 11 and the first system 10 to enable the second control module 32 to be controlled by the first system 10.

In the HVDC transmission system as described above, there are optical communication modules between the first system 10 and the first COL 11, between the first COL 11 and the first control module 31, between the first COL 11 and the second COL 21, between the second system 20 and the second COL 21, and between the second COL 21 and the second control module 32 to transmit and receive data without using typical SCSI cables.

In the case that the optical communication module is used, data validity and real-time property may be improved five times or more than when using the SCSI cable, and it is possible to minimize malfunction due to external noise.

FIG. 3 illustrates the detailed structure of the first COL 11. Although the structure of the second COL 21 is not shown, it is the same as that of the first COL 11.

As shown in FIG. 3, the first COL 11 includes a system control unit 111, a monitoring unit 112, a command control unit 113, and a COL control unit 114.

The system control unit 111 checks the current states of the first system 10 and the first COL 11 and delivers a command to stop their operations when malfunction is found, the COL control unit 114 exchanges data between the COLs, checks whether there is an error, and transmits the current states of the first system 10 and the first COL 11 to a counterpart COL control unit (the COL control unit of the second COL), and the command control unit 113 delivers a control command to the first control module 31 according to the state of the first COL 11.

Also, the monitoring unit 112 checks the connection or wiring state of the optical communication modules and the validity of transmission data in real time to deliver them to the system control unit 111. Accordingly, the first system 10 may accurately set a right and update state information.

As discussed above, since the redundant control device of the HVDC transmission system transmits and receives data through optical communication modules and monitors the connection or wiring state of the optical communication modules and the validity of transmission data in real time, there is an advantage in that it is possible to transmit and receive data reliably.

Each component and/or function described in various embodiments above may be combined each other, and a person skilled in the art may understand that various modifications and changes may be implemented without departing from the spirit and scope of the present disclosure set forth in the following claims.

What is claimed is:

1. A redundant control device of a high voltage direct current (HVDC) transmission system, the redundant control device comprising:

a first system and a second system that performs a function corresponding to that of the first system; and a first change over logic (COL) and a second COL that determine whether to switch between the first system and the second system, wherein there are optical communication modules between the first system and the first COL, between the first COL and the second COL, and between the second system and the second COL to transmit and receive data, wherein the first COL and the second COL comprise a monitoring control unit that checks a connection or wiring state of the optical communication modules and validity of transmission data, and wherein the first COL controls the first control module, the second COL controls the second control module, and according to states of the first system and the second system, the first COL controls the first control module and the second control module or the second COL controls the first control module and the second control module.

2. The redundant control device according to claim 1, wherein the first COL comprises a system control unit that checks current states of the first system and the first COL and delivers a command to stop their operations when malfunction is found, a COL control unit that exchanges data with the second COL, checks whether there is an error, and transmits current states of the first system and the first COL to the second COL, and a command control unit that delivers a control command to the first control module according to a state of the first COL.

3. The redundant control device according to claim 1, wherein there are optical communication modules between the first COL and the first control module and between the second COL and the second control module to transmit and receive data.

* * * * *